(12) United States Patent
Jain et al.

(10) Patent No.: US 11,430,166 B1
(45) Date of Patent: Aug. 30, 2022

(54) FACILITATING GENERATION OF NUMBER-BULLET OBJECTS

(71) Applicant: ADOBE INC., San Jose, CA (US)

(72) Inventors: Ashish Jain, Delhi (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/466,923

(22) Filed: Sep. 3, 2021

(51) Int. Cl.
*G06T 11/60* (2006.01)
*G06T 3/20* (2006.01)
*G06T 3/40* (2006.01)
*G06V 10/25* (2022.01)

(52) U.S. Cl.
CPC ............... *G06T 11/60* (2013.01); *G06T 3/20* (2013.01); *G06T 3/40* (2013.01); *G06V 10/25* (2022.01); *G06T 2210/12* (2013.01)

(58) Field of Classification Search
CPC ............................ G06T 11/60; G06T 2210/12
See application file for complete search history.

(56) References Cited

U.S. PATENT DOCUMENTS

| 2010/0088605 | A1* | 4/2010 | Livshin | G06Q 10/00 715/731 |
| 2017/0220859 | A1* | 8/2017 | Grams | G06F 40/174 |
| 2018/0088747 | A1* | 3/2018 | Grams | G06F 40/137 |
| 2021/0011895 | A1* | 1/2021 | Blanchflower | G06F 40/279 |
| 2021/0064697 | A1* | 3/2021 | Fox | G06F 16/328 |
| 2021/0118129 | A1* | 4/2021 | Kearney | G06N 3/088 |

* cited by examiner

*Primary Examiner* — Phi Hoang
(74) *Attorney, Agent, or Firm* — Shook, Hardy & Bacon L.L.P.

(57) ABSTRACT

Embodiments of the present technology provide systems, methods, and computer storage media for facilitating generation of number-bullet objects. In some embodiments, an image to use as a bullet portion in generating number-bullet objects is identified. Further, a first text item and a second text item for which to generate corresponding number-bullet objects are also identified. Thereafter, a first number-bullet object for the first text item is automatically generated by overlaying a first number over the image, and a second number-bullet object for the second text item is automatically generated by overlaying a second number over the image, the first number and the second number indicating a sequential order of the first text item and the second text item. The first number-bullet object can be presented in vertical alignment with the first text item and the second number-bullet object in vertical alignment with the second text item.

20 Claims, 13 Drawing Sheets

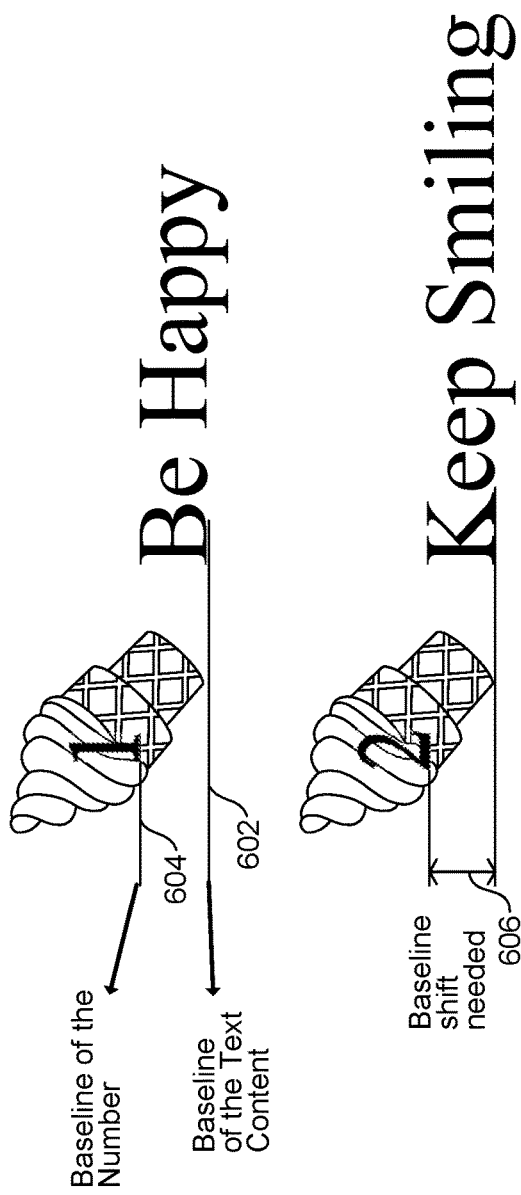
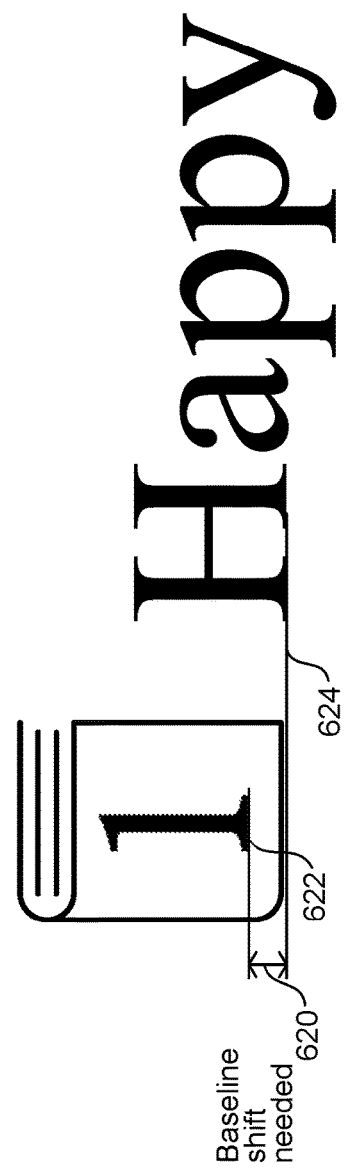
FIG. 6A
FIG. 6B

FACILITATING GENERATION OF NUMBER-BULLET OBJECTS

BACKGROUND

Content creators can use bullets or numbering in association with a list of items. In particular, using bullets or numbers to precede items can facilitate ease of viewing or reading a set of items (e.g., in a sequential order). Typically, conventional systems enable a content creator to utilize either bullets or numbering to itemize a set of items. For example, a consistent style of bullets may be used to precede items in a list. As another example, a numbering system may be used to sequentially precede items in a list. To use a combination of bullets and numbers, however, is tedious and resource intensive as each aspect must be manually performed by a user.

SUMMARY

Embodiments described herein relate to facilitating automated generation of number-bullet objects. A number-bullet object generally includes a combination or aggregation of a bullet and a number that indicates a sequential order of a corresponding text item in a list of items. Generally, the number overlays the bullet to provide an insight as to order in a visually pleasing manner. At a high-level, number-bullet objects are generated for a selected set of items using a selected image. In this regard, a user may select an image for use as the bullet in the number-bullet objects and, thereafter, number-bullet objects are created for various items in a listing. Embodiments described herein include various methods for determining appropriate sizing and placement of the number-bullet objects, or aspects thereof. For example, an image, text areas, or the like may be appropriately scaled to more visually correspond with the text item. Further, placement of the number within the image and/or placement of the number-bullet object relative to the corresponding text item can facilitate a visually appeal presentation of the number-bullet objects.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 6A-6B provide examples of a baseline shift, in accordance with embodiments described herein;

DETAILED DESCRIPTION

Figure 1:
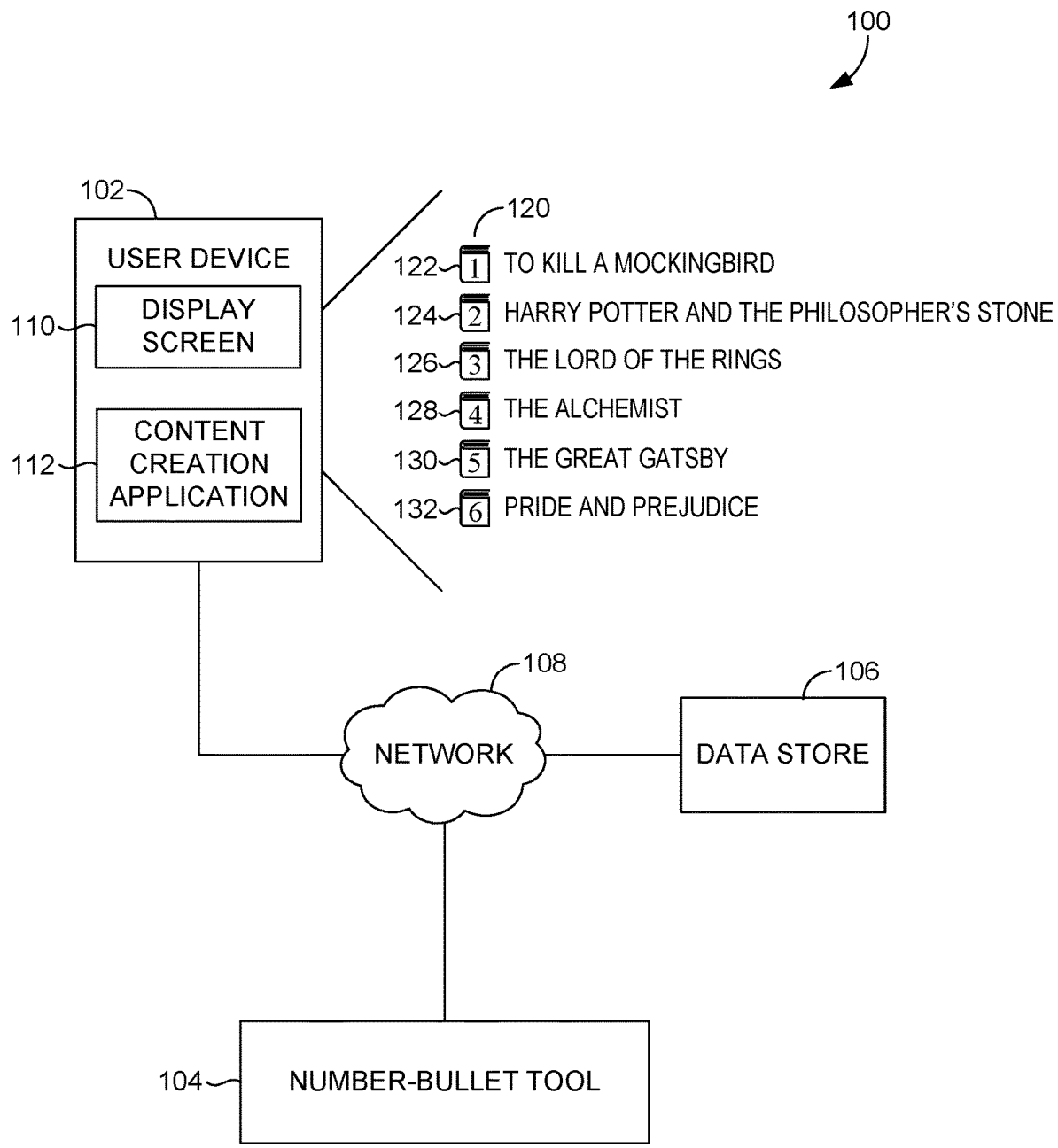
FIG. 1 is a block diagram of an exemplary operating environment in which embodiments of the present disclosure may be employed.

The subject matter of the present technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Many content creators use bullets or numbering in association with a list of items. In particular, using bullets or numbers to precede items can facilitate ease of viewing or reading a set of items (e.g., in a sequential order). Typically, conventional systems enable a content creator to utilize either bullets or numbering to itemize a set of items. For example, a consistent style of bullets may be used to precede items in a list. As another example, a numbering system may be used to sequentially precede items in a list.

In some cases, however, a content creator may desire to use a combination of numbers and bullets in association with a list of items. In particular, a content creator may wish to create numbered lists in association with bullets in the form of a creative design. For example, a content creator may desire to integrate the visual appeal of bullets with the logical sequence of a numbered list. With conventional systems, to generate a creative numbered list, a content creator is limited to the different text fonts and styles to create a numbered list. However, using different numeral fonts and/or styles still lacks bullets or any other design aspects. To apply a more customized visual effect on a numbered list, a user can manually create such a list by placing designs before each item in a list, create a separate text frame above the design, and then type the numbered characters as appropriate for each item. Implementing each of these aspects for each item in a list, however, is tedious, time consuming, and error prone for a user.

Further, if any changes are desired, the process is even more tedious as the numbers are in textual form and not in a list form. As such, even a slight modification to such lists is laborious. For instance, if a user is interested in deleting an item in a list, the user has to manually update the numbers of each design to provide a correct pattern of numbers. As another example, if any new item is added to a list, the user has to manually place the design and the text frame as well as review and edit numbering for other items in the list to provide a correct pattern of numbers. Further, if an update is needed for an original design used as the background of a numbered list, the user must manually update the other design objects, delete the text frames, generate the newly designed objects and text frames, and then retype the numbers.

In addition to the tedious and time consuming efforts required to make such manual modifications, computing resources are utilized to perform renderings of each of the manual modifications. As can be appreciated, as the number of modifications increases, the amount of computing resources being used also increases. Accordingly, manually creating visually appealing numbers to itemize items in a list utilizes both user resources and computing resources.

As such, embodiments described herein are directed to facilitating generation of visually appealing numbered lists. In this regard, a numbered list can correlate with design objects to itemize a list. In embodiments, a user may select any image or design that can be used as a design object, or bullet, as a background for the numbers of the numbered list. As described, a number-bullet object may be generated for each item in a list, for example, as selected by a user or automatically determined. In some examples, each number-bullet object includes a combination or aggregation of a bullet and a numeral, or other character, that represents a sorted or sequential order. For example, a first number-bullet object including a number "1" overlaying a bullet may be generated to precede a first item in a list, a second number-bullet object including a number "2" overlaying the bullet may be generated to precede a second item in the list, and so on.

To generate number-bullet objects in association with items, a copy of the selected bullet can be created. For example, a copy may be made of a user-selected object or image for use in a number-bullet object. In addition to creating a copy of a desired bullet, a number text frame can also be automatically created. A number text frame generally refers to a text frame in which a number is to be placed. As such, a number corresponding with the list, such as "1," may be placed in the text frame. A text frame can be of any size. In some cases, the text frame may be of a size equal to or approximate to a bounding box identified for the number based on a corresponding glyph(s). The number included in the text frame is the number to be used for the number list (e.g., "1"). Such a number may be presented in accordance with a particular size and/or style. For example, a size and/or style of font used in association with the text item may be applied to the number and input into the text frame. A number text frame may be placed in any position associated with a bullet. In embodiments, a number text frame may be positioned in relation to the candidate number text area (e.g., automatically detected or specified by a user). For instance, in some cases, the number text frame may be centered in the candidate number text area. In other cases, the number text frame may correspond with the boundaries of the candidate number text area.

As described herein, embodiments also enable maintaining text styles and types applied to the associated text items, such that the numerals visually correspond with text items in the list. The number-bullet objects, or portions thereof, can also be scaled and/or positioned to visually align and match the corresponding text items.

Advantageously, using an automated approach described herein to generate visually appealing numbered lists, computer resources are reduced. In particular, as opposed to all the computing processing performed for manipulating each item in the manual process described above, a single object and number placement can be performed a single instance and replicated for each item. Further, user time and resources are reduced and the automatically generated number-bullet objects maintain consistency across objects and in connection with the corresponding text items.

Having briefly described an overview of embodiments of the present technology, an exemplary operating environment in which embodiments of the present technology may be implemented is described below in order to provide a general context for various aspects of the present technology. Referring initially to FIG. 1 in particular, an exemplary operating environment for implementing embodiments of the present technology is shown and designated generally as system 100. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 may include a user device 102, a number-bullet tool 104, and a data store 106. It should be understood that the system 100 shown in FIG. 1 is an example of one suitable computing system architecture. Each of the components shown in FIG. 1 may be implemented via any type of computing device, such as computing device 1300 described with reference to FIG. 13, for example. The components may communicate with each other via a network 108, which may include, without limitation, one or more local area networks (LANs) and/or wide area networks (WANs). Such networking environments are commonplace in offices, enterprise-wide computer networks, intranets, and the Internet.

It should be understood that any number of user devices, number-bullet tools, and/or data stores may be employed within the system 100 within the scope of the present technology. Each may comprise a single device or multiple devices cooperating in a distributed environment. For instance, the number-bullet tool 104 may be provided via multiple devices arranged in a distributed environment that collectively provide the functionality described herein. Additionally, other components not shown may also be included within the network environment.

The data store 106 is generally accessible to components of the number-bullet tool 104. In this regard, various components may store data to, or access data from, the data store 106. Data store 106 may include any type of data in relation to the number-bullet tool 104. By way of example only, and as described in more detail below, the data store 106 may include number-bullet objects, images, font or glyph information, candidate number text areas, or the like.

The illustrated environment 100 includes a user device 102 having a display screen 110 on which a user interface may be displayed to support user interaction. The user device 102 may be configured in a variety of ways. The user device 102, for instance, may be configured as a desktop computer, a laptop computer, a mobile device (e.g., a handheld configuration such as a tablet or mobile phone), and so forth. In some implementations, the computing device 102, such as a portable or mobile device, includes the display screen 110 (as illustrated in FIG. 1). That is, a display screen is integrated or coupled with the user device. In other implementations, a display screen 110 is remote from, but in communication with, the user device. The display screen is a screen or monitor that can visually present, display, or output information, such as, for example, number-bullet objects.

The user device 102 is illustrated as including a content creation application 112. The content creation application 112 enables a user to create content. Content may include any type of content, which generally includes textual content, image content, media content, and/or the like. In particular, and as described herein, content creation application 112 can facilitate creation and/or presentation of number-bullet objects.

To do so, the content creation application 112 may accept and process user inputs to generate number-bullet objects within an electronic document. A user, for example, may provide inputs using a selector/cursor control device, touch, gesture, stylus, and so on to create content, including number-bullet objects. For example, with a touch screen implementation, a touchscreen display enables detection of location of touches or contact within a display area. In this regard, a touchscreen display refers to a display screen to which a user can provide input or interact therewith by making physical contact or near contact with the display screen. An illustrative example includes a user utilizing his or her finger to tap or move, or use some other form of touch action, to interact with a user device. Other items, such as a stylus, fingernail, etc., may be used to provide input to the device by way of touchscreen display. As such, a touchscreen display can be used as an input component irrespective of whether a keyboard or mouse is used as an input component for interacting with displayed content. As another example, in a virtual or augmented reality environment, a user may provide gestures as inputs. As yet another example, a mouse or selector may be used to provide inputs to create and/or manipulate number-bullet objects.

The content creation application 112 may use the number-bullet tool 104 to facilitate generation of number-bullet objects. The number-bullet tool 104 may use data or input provided via the user device 102 to generate desired number-bullet objects. For example, via the user device 102, a user may input or select a desired image to utilize as the bullet, input or select a type of "number" to represent the ordered list, and/or input or select an item, or a set of items, for which to associate a number-bullet object(s).

As used herein, a number-bullet object generally refers to a combination of a number and a bullet visually presented as an aggregated object. In this regard, a number and a bullet can overlay one another to generate a number-bullet object. A bullet generally refers to a graphical representation that is presented in an electronic document before a line of type, also referred to herein as an item, to emphasize the line of type, or item. For example, a bullet may be in a shape of a circle presented before an item in a list. A bullet may be of any format, shape, and/or design. In embodiments, bullets may be in the form of an image. Further, although referred to as a number-bullet, the number aspect may be a numeral, but is not intended to be limited hereto. As such, as used herein, a "number" may reflect any type of character, such as an alphabet character or any other type of character used to represent an ordered list.

Upon generating number-bullet objects, the content creation application 112 can facilitate display of content on the display screen 110 of the user device 102. In this way, a number-bullet object, or a set of number-bullet objects, may be visually displayed to the user via the user device. FIG. 1 provides one example of a set of number-bullet objects 120. Each of the number-bullet objects 122, 124, 126, 128, 130, and 132 precedes a corresponding item in a list. As shown, each number-bullet object reflects an aggregated number and bullet. For example, with respect to number-bullet object 122, the number "1" overlays the bullet (in the form of an image of a textbook). Advantageously, using number-bullet objects enables a visually enhanced manner of presenting an ordered list of items (e.g., via the bullets).

Figure 2:
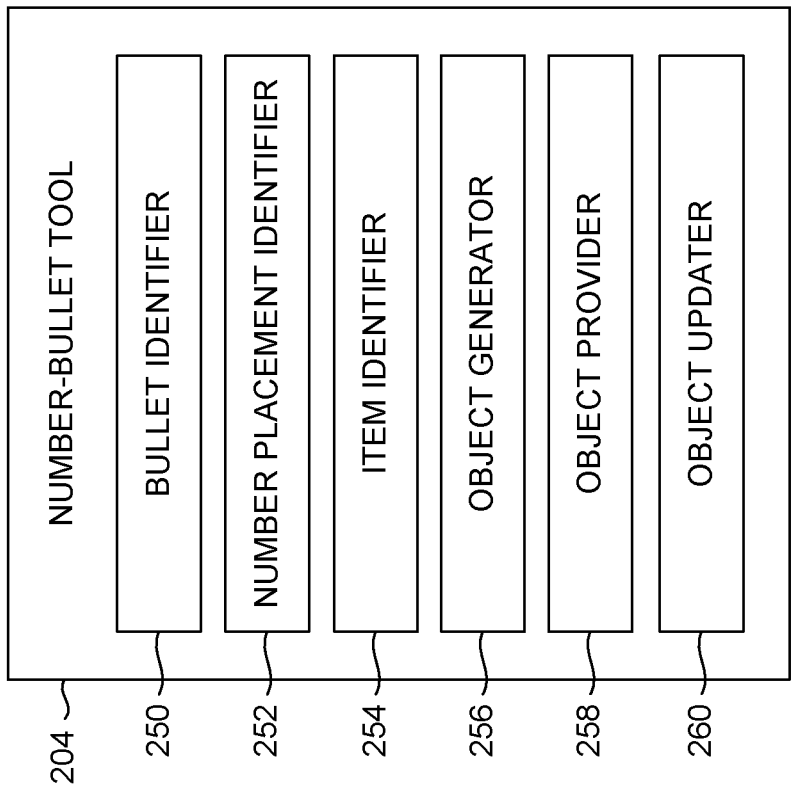
FIG. 2 is a block diagram illustrating an exemplary number-bullet tool, in accordance with one embodiment of the present disclosure.

Turning now to FIG. 2, a block diagram is provided illustrating an exemplary number-bullet tool 204 in which some embodiments of the present technology may be employed. The number-bullet tool 204 is generally configured to facilitate generating or creation of number-bullet objects. As described, the number-bullet tool can operate and execute to generate number-bullet objects for corresponding items (e.g., in a list or set of items). A number-bullet object can be any object that visually represents a bullet and an ordered character (e.g., numeral or alphabet character).

In some cases, the number-bullet tool 204, or aspects thereof, may be incorporated into a content creation system or environment. For example, the number-bullet tool 204 may be incorporated into content creation application 110 operating on user device 102. As such, although the number-bullet tool 204 is illustrated separate from the user device, the number-bullet tool 204, or a portion thereof, may be integrated with the content creation application 110 operating on the user device 102. Additionally or alternatively, the number-bullet tool 204, or portion thereof, may operate on a server remote from the user device 102 and accessible via the network 108. For instance, the number-bullet tool 204 may be part of a content creation system operating on a server (or network of servers) or in a cloud-computing service that communicates with the content creation application 110 executing on the user device 102.

As shown in FIG. 2, the number-bullet tool 204 includes a bullet identifier 250, a number placement identifier 252, an item identifier 254, an object generator 256, an object provider 258, and an object updater 260. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As can be appreciated, any functionality described in association with the number-bullet tool 204 may be performed at the user device (e.g., via an application such as content creation application) or remote from the user device (e.g., via a server that communicates with an application operating on the user device 102). For example, some of the components may operate at the user device, while other components may operate a server device.

The bullet identifier 250 is generally configured to identify a bullet for use in generating a number-bullet object(s). As previously described, a bullet may be any of a variety of different shapes, images, forms, etc. In some cases, a user may input or select a desired bullet for use in generating number-bullet objects. Such a selection may occur in any of a number of ways. For example, a user may select a desired image as a bullet from a listing or presentation of a set of different images. In other cases, a user may navigate (e.g., via computing storage, the Internet, content creation application, etc.) to an image desired for use as a bullet.

The user may provide any indication that a bullet is desired for creating number-bullet objects. For example, a user may right click on a desired bullet or hover over a desired bullet and provide an indication to use the bullet in number-bullet objects. For instance, upon right-clicking on an image, a menu may be presented that includes, among other things, a "use for number-bullet object." Upon selection thereof, the image is identified for use in generating number-bullet objects.

The number placement identifier 252 is generally configured to identify candidate placement of a number(s) within a bullet. In this regard, as a number, or other character, is placed in association with a bullet (e.g., image), the number placement identifier 252 may determine a placement or position for the number in relation to a selected bullet. Determining placement or position of a number(s) may occur in any number of ways. For example, in one embodiment, a user may select a placement for a number. For instance, a user may utilize a selection tool to select an area or region in relation to a displayed bullet (e.g., within a region or boundary) for use as a text area in which numbers, or other characters, may be positioned. For example, a user may use a pointer to select and drag a cursor to specify an area for number placement. In some cases, a user may further specify to use the selected area as a number text area. For example, upon selecting an area within a bullet, the user may right click to view a menu and to select "use as number text area" within the menu.

Figure 3:
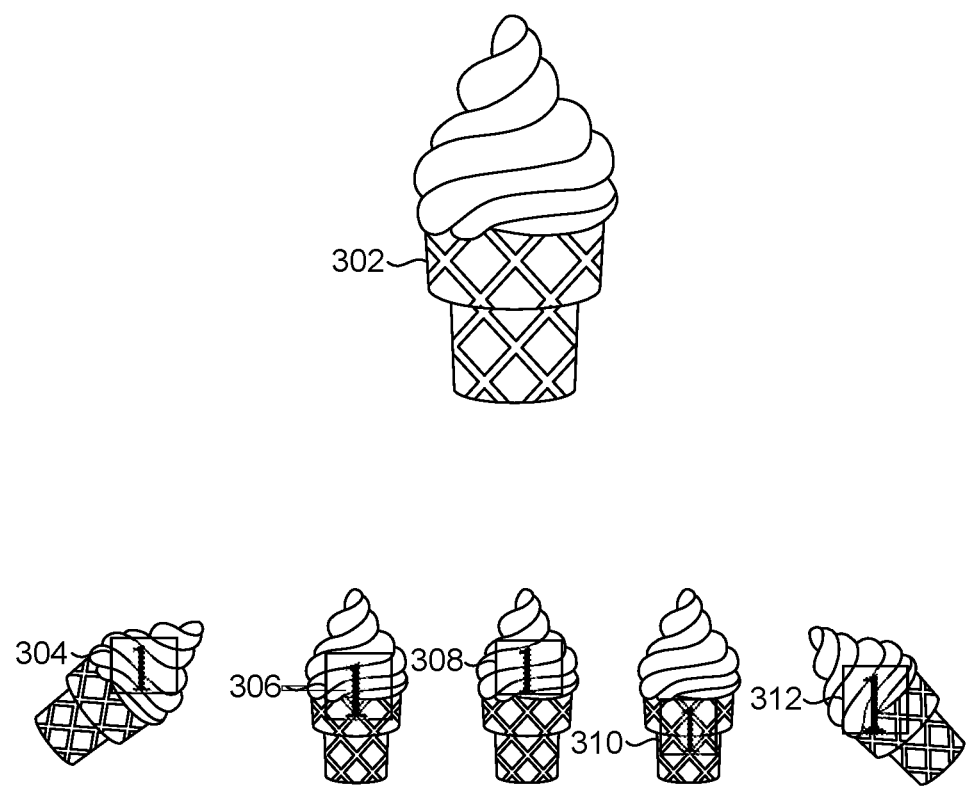
FIG. 3 provides example user-selected number text areas, in accordance with an embodiment of the present disclosure.

By way of example, and with reference to FIG. 3, assume a user selects an ice-cream image 302 as a bullet. Upon selecting the ice-cream image 302, the user may select a number text area within the ice-cream image 302. As illustrated in FIG. 3, the user may select number text area 304, 306, 308, 310, or 312. Each of the number text areas 304, 306, 308, 310, and 312 correspond with different portions of the ice-cream image 302 and, thereby, would result in a number being positioned in the different portions of the ice-cream image 302.

Alternatively or additionally, a candidate number placement may be automatically determined. In one embodiment, a candidate number placement may be automatically (e.g., without user selection or indication) determined based on a visual area associated with a bullet (e.g., graphic) that maintains readability (e.g., by a user). In this regard, visual balance can be used to identify an optimal placement for a number in relation to a bullet. Visual balance is generally defined in terms of visual weights. Visual weights generally refer to a measure or an extent of how much an element attracts an eye(s) of a viewer. A visually heavy element will attract a user's eyes, whereas a visually light element is less likely to attack a user's eyes. To this end, to automatically determine placement of a number within a bullet, a salient region of a bullet can be detected using a visual balance approach.

To determine saliency, a graph-based saliency model can be used that incorporates saliency features (e.g., low-level saliency features), such as color, intensity and orientation. A saliency map is generated to represent saliency features. As can be appreciated, a saliency map can include a linear combination of normalized maps associated with saliency features (e.g., color, intensity, and orientation). For example, assume three normalized maps are generated for a color feature C, an intensity feature I, and an orientation feature O. In such a case, a saliency map S is generated as follows:

$$S=\tfrac{1}{3}[N(C)+N(I)+N(O)] \qquad \text{(Equation 1)}$$

In one embodiment, to generate such a saliency map S, a bullet image is processed through standard color, orientation, and intensity multi-scale channels to generate corresponding feature maps. Each of the feature maps are normalized to the same range and added with equal weights to generate a final saliency map S.

Using the saliency map S, a center of mass of the bullet may be identified. A center of mass generally indicates an area of interest of a bullet. In this regard, the center of mass generally includes a unique point in the saliency map that includes a center of a distribution of mass in space that has the property that the weighted position vectors relative to this point sum to zero (equally distributed). In one example, a center of mass $(x_c, y_c)$ of a bullet may be determined from weights W(x,y) as follows:

$$x_c = \frac{\sum_{j=1}^{h}\sum_{i=1}^{w} W(i,j) \times i}{\sum_{j=1}^{h}\sum_{i=1}^{w} W(i,j)}$$

$$y_c = \frac{\sum_{i=1}^{w}\sum_{j=1}^{h} W(i,j) \times j}{\sum_{i=1}^{w}\sum_{j=1}^{h} W(i,j)}$$

In this example, w represents the width of the bullet object, h represents the height of the bullet image, and weight W(x,y) reflects the visual weights at the pixel coordinates (x,y). Upon determining the center of mass $(x_c, y_c)$ of a bullet, a surrounding area with high visual weights can be identified. For example, pixels associated with visual weights exceeding a threshold may be identified as having high visual weights. The area including the center of mass and surrounding pixels corresponding with high visual weights may be identified as a candidate placement for a number(s). In some cases, the candidate number text area for placement may be a largest rectangular area (or other shape) that fits inside the visual area having high visual weights.

In some cases, the number placement identifier 252 may generate a number-bullet object template. A number-bullet object template generally refers to a template or representation of a number-bullet object that aggregates a candidate number (or other character), or candidate number text area, with the identified bullet. In this regard, the number placement identifier 252 may overlay or otherwise aggregate a first number (e.g., number 1), or a number text area, on an identified or selected bullet in accordance with the identified placement. A candidate number refers to a candidate or potential number to be placed in association with the bullet. For example, in some cases and as shown in FIG. 1, the number "1" may be aggregated or overlayed with the bullet in the identified candidate location. A candidate number text area refers to a candidate text area in which to place a number in association with a bullet. In some cases, the number-bullet object template may be presented to a user via a user device. For example, upon generating a number-bullet object template, such a template may be presented via a display screen for use by a user to select items, as described below.

The item identifier 254 is generally configured to identify an item, or a set of items, for which number-bullet objects are to correspond. In embodiments, an item(s) for which a number-bullet object(s) is to be generated can be identified based on a user selection or an automated identification. For example, a user may select a set of items for associating number-bullet objects. Such a selection may be performed in any number of ways. As one example, a user may drag and drop a number-bullet object template over a set of items (e.g., in a text box). As another example, a user may select a number of items via a selector or mouse. In other cases, the item identifier 254 may identify items in a list automatically. For example, each item in an electronic document may be identified (e.g., based on a previously generated bullet or number used to differentiate each item in a list).

The object generator 256 is generally configured to generate number-bullet objects in association with items (e.g., user selected items). As described, a number-bullet object may be generated for each item in a list, for example, as selected by a user or automatically determined. In some examples, each number-bullet object includes a combination or aggregation of a bullet and a numeral, or other character, that represents a sorted order. For example, a first number-bullet object including a number "1" overlaying a bullet may be generated to precede a first item in a list, a second number-bullet object including a number "2" overlaying the bullet may be generated to precede a second item in the list, and so on.

To generate number-bullet objects in association with items, a copy of the selected bullet can be created. For example, a copy may be made of a user-selected object or image for use in a number-bullet object. In addition to creating a copy of a desired bullet, a number text frame can also be automatically created. A number text frame generally refers to a text frame in which a number is to be placed. As such, a number corresponding with the list, such as "1," may be placed in the text frame. A text frame can be of any size. In some cases, the text frame may be of a size equal to or approximate to a bounding box identified for the number based on a corresponding glyph(s). The number included in the text frame is the number to be used for the number list (e.g., "1"). Such a number may be presented in accordance with a particular size and/or style. For example, a size and/or style of font used in association with the text item may be applied to the number and input into the text frame. A number text frame may be placed in any position associated with a bullet. In embodiments, a number text frame may be positioned in relation to the candidate number text area (e.g., automatically detected or specified by a user). For instance, in some cases, the number text frame may be centered in the candidate number text area. In other cases, the number text frame may correspond with the boundaries of the candidate number text area.

As described, it may be desirable to have the number-bullet object, and aspects thereof, be proportional to the item to which the number-bullet corresponds. For example, in cases that a text item in a list is of a particular font size, it may be desirable to have the bullet and/or number portion of the number-bullet object be of a similar size. Accordingly, the object generator 256 may identify or determine a size associated with the number-bullet objects. In some cases, the object generator 256 may determine proportional scaling for the bullet, the number text frame, the bounding box of the number, and/or the number. Scaling is generally used to accommodate number-bullet components together (e.g., bullet and number), given any character property applied on it, for example, by a user.

In one embodiment, to do so, the object generator 256 may determine a scaling factor to be applied to scale components or aspects of the number-bullet objects. The scaling factor can be applied to, for example, the bullet, the number text frame, the number bounding box, the number, etc.

Determining a scaling factor may be performed in any number of ways. As one example, a scaling factor may be determined in accordance with the identified candidate number text area. As previously described, the candidate number text area may be user defined or automatically determined (e.g., using visual saliency). At a high level, to determine a scaling factor, a scaling needed to resize the candidate number text area to fit a bounding box of the number while maintaining the aspect ratio of the candidate number text area is identified.

As one particular example, assume a number to be included in a number-bullet object includes a set of one or more glyphs. Each glyph may represent a single numeral character. For example, assume the number "10" is to be included in a number-bullet object. In such a case, the number "10" includes a "1" glyph and a "0" glyph. For each glyph to be used to represent a number for a number-bullet object, a glyph identifier of the corresponding glyph is identified or extracted. In addition to identifying or extracting glyph identifiers, various properties of the items for which number-bullet objects are generated are extracted or identified. For example, for styles applied to text items for which number-bullet objects are to be generated, font size, vertical scale, horizontal scale, tracking, and/or the like may be identified or extracted. Tracking generally refers to individual character spacing among text in typography.

Figure 4A:
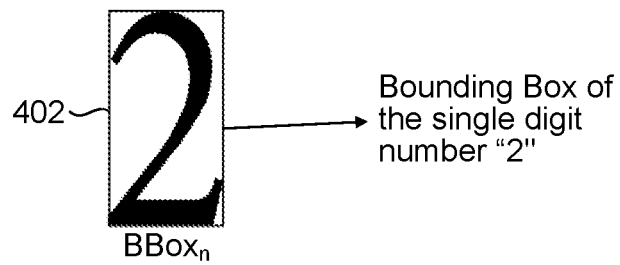
FIGS. 4A-4B illustrate bounding boxes for numbers, in accordance with an embodiment of the present technology.
Figure 4B:
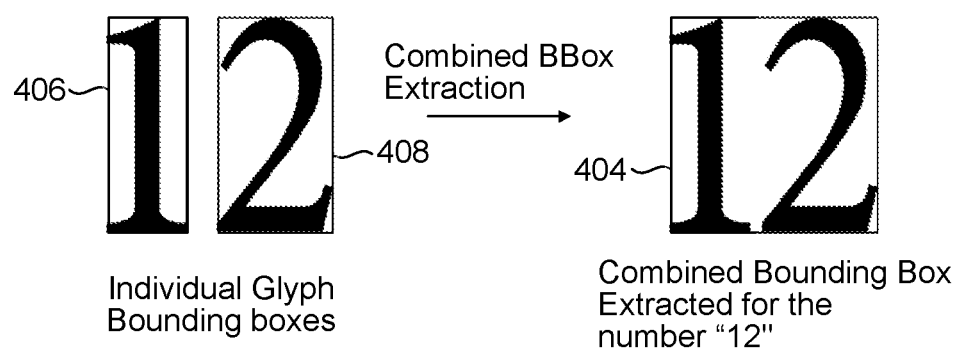

In cases in which a single glyph constitutes a number, for a given font size, vertical scale, horizontal scale, and tracking, a bounding box ($BBox_n$), of the single glyph is identified or extracted. In cases in which multiple glyphs constitute a number, individual bounding boxes can be identified for each glyph and, thereafter concatenated together to form a final bounding box for the combined glyphs. In particular, a bounding box for each single glyph is identified and then the bounding boxes are concatenated to generate a bounding box, $BBox_n$ for the number. This concatenated bounding box is such that its left edge is same as the left edge of the left most glyph's bounding box, and its right edge is equal to the right edge of the right most glyph's bounding box. By way of example, and with reference to FIG. 4A-4B, FIG. 4A illustrates a bounding box 402, $BBox_n$, identified for a single digit number. FIG. 4B illustrates a bounding box 404, $BBox_n$, identified for a number with multiple glyphs. In this example, the bounding box 406 for the number "1" is identified and the bounding box 408 for the number "2" is identified. The bounding boxes 406 and 408 are combined to generate bounding box 404 to represent the number "12."

The bounding box of the candidate number text area, $BBox_{T4}$, is also identified or determined. The bounding box for the number and the bounding box for the candidate number text area can then be used to identify a scaling factor. In this way, a scaling factor can be identified by determining a scaling required for resizing the bounding box of the candidate number text area, $BBox_{TA}$, to fit the bounding box of the number, $BBox_n$, inside itself while maintaining the aspect ratio of the bounding box of the candidate number text area.

In embodiments, the scaling factor can be determined using a width scaling factor and a height scaling factor. A width scaling factor refers to scaling factor associated with the width of bounding boxes, and a height scaling factor refers to a scaling factor associated with the height of bounding boxes. One example for identifying a scaling factor based on a width scaling factor and a height scaling factor includes the following:

Width Scale=$BBox_n$·Width/$BBox_{TA}$·Width,

Height Scale=$BBox_n$·Height/$BBox_{TA}$·Height,

Scale $S$=Minimum of (Width Scale,Height Scale).

In this regard, the width scaling factor is determined by dividing the width of the bounding box of the number by the width of the bounding box of the candidate number text area, and height scaling factor is determined by dividing the height of the bounding box of the number by the height of the bounding box of the candidate number text area. Upon determining the width scaling factor and the height scaling factor, the larger or maximum of the two scaling factors is selected as the scaling factor to use.

In accordance with some embodiments described herein, a scaling factor Sn is determined for each number to be used in number-bullet objects for corresponding items. As described herein, the scaling factor Sn for a particular number n is used to scale the bullet and the candidate number text area to generate the number-bullet object associated with the number n. In this regard, upon determining a scaling factor in association with a particular number, the object generator 256 can apply the scaling factor to the bullet and the candidate number text area in which the number is to be placed. As such, a scaled bullet and a scaled candidate number text area can be determined. As one example, a scaled bullet and a scaled bounding box for the candidate number text area ($BBox_{TA}$) can be determined as:

Scaled Bullet=(Bullet Width*$S$,Bullet Height*$S$)

Scaled $BBox_{TA}$=($BBox_{TA}$Width*$S$,$BBox_{TA}$Height*$S$)

In addition to obtaining an appropriate size of the bullet and the candidate number text area, the object generator 256 may also identify a position for placement of various aspects. In embodiments, the object generator 256 may determine a location for a number text frame. For example, the center position P of the scaled candidate number text area with respect to the scaled bullet may be determined. The object generator 256 can then place a number text frame, $T_{frame}$, over the scaled bullet with its center coinciding with the center position P of the scaled candidate number text area. By centering a text frame in the center of the scaled candidate number text area (e.g., provided by a user), the number can thereby be placed in the center of the scaled candidate number text area.

Upon determining sizing and placement, the number-bullet object can be generated. In this regard, for a particular number-bullet object for a number, a number text frame can be aggregated with the bullet. To this end, a number text frame, for example equal to the size of the bounding box determined for the number with its content the same as the number glyphs to be used based on styles applied, can be aggregated with the scaled bullet. For instance, the number text frame can be positioned with its center corresponding with the center position P of the scaled candidate number text area.

Number-bullet objects can be generated for each number in a numbered list corresponding with the items in the list. For example, assume a user selects a list having ten items. In such a case, ten number-bullet objects can be created.

Figure 5:
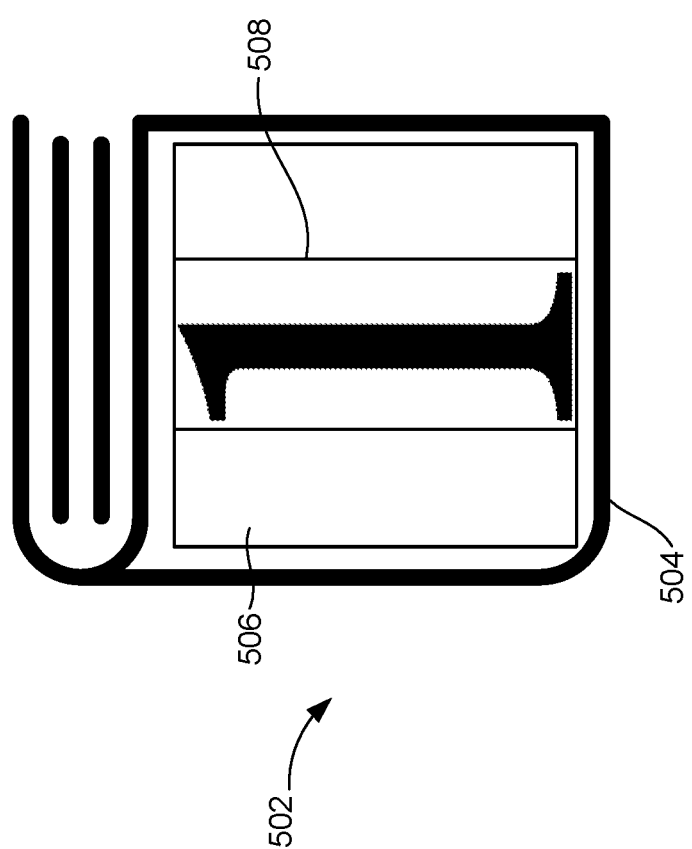
FIG. 5 provides an example of a number-bullet object, in accordance with embodiments described herein.

By way of example, and with reference to FIG. 5, FIG. 5 provides an example number-bullet object 502. In this example, the bullet 504 and the candidate number text area 506 have been scaled, and the number text frame 508 is positioned in the center of the scaled candidate number text area. The number text frame 508 can be generated approximately equal to the size of the bounding box determined for the number "1" having a style that matches text of a corresponding text item in a list.

The object placement identifier 258 is generally configured to identify placement for the number-bullet object(s) such that the number-bullet object(s) is presented in association with the corresponding item. In embodiments, to associate the number-bullet object to a text item, the number-bullet object can be converted to an inline object. An inline object generally refers to an object that is placed directly and/or visually into the text flow. By default, an inline object is placed or positioned on a baseline of the associated text content. To this end, the object placement identifier 258 may identify placement of the number-bullet object as along a baseline, for example, a particular distance preceding an item on the same line.

In some embodiments, the object placement identifier 258 may identify a baseline shift for placement of the number-bullet object. For example, in some cases, placement of a number-bullet object on a baseline of the associated item may result in a mismatch or misalignment of the number-bullet object and corresponding item. Accordingly, to align the number-bullet object and the corresponding item in a more visually appealing manner, the object placement identifier 258 may identify a baseline shift that can be used to shift the number-bullet object such that the number-bullet object aligns with the corresponding item. A baseline shift generally refers to a shift or movement of an object, such as a number-bullet object, in the vertical direction (up or down) relative to a baseline. In embodiments, the baseline shift identified for a number-bullet object can be determined to align the glyphs in the text frame of the number-bullet object to the reference baseline of the text. The baseline shift can be applied to the number-bullet object to align the number-bullet object with the corresponding item. A baseline shift can be determined for each number-bullet object. In some cases, a particular determined baseline shift may be applied to each of the number-bullet objects.

By way of example, and with reference to FIG. 6A-6B, FIGS. 6A-6B illustrate examples of a baseline shift. For instance, in FIG. 6A, the baseline of the text content of the item is illustrated as 602. The baseline of the number is shown as 604. The baseline shift 606 can be identified that aligns the baseline of the number 604 with the baseline of the corresponding item 602. As another example, in FIG. 6B, the baseline shift 620 is determined to align the bottom of the number 622 with the bottom of the corresponding item 624.

The object provider 258 is generally configured to provide number-bullet objects. In particular, the object provider 258 provides number-bullet objects for presentation of the number-bullet objects via a display screen. As can be appreciated, in some cases, the number-bullet objects can be provided for presentation along with the corresponding items. For example, the number-bullet objects may be incorporated into an electronic document in appropriate locations and presented to a user. In embodiments, the number-bullet objects are presented in association with the corresponding item. For example, a first number-bullet object reference "1" is positioned adjacent to the first item in the list, a second number-bullet object referencing "2" is position adjacent to the second item in the list, and so on. Advantageously, in accordance with embodiments described herein, the numbered-bullet objects can be proportional in size. To this end, the number-bullet objects, and portions thereof (e.g., numbers), can be visually proportional to the items to which they correspond. For instance, the numbers in the number-bullet objects may be of a same or similar font size and/or style as the text items. Further, the number-bullet objects can be provided in a visual alignment with the corresponding items.

Figure 7A:
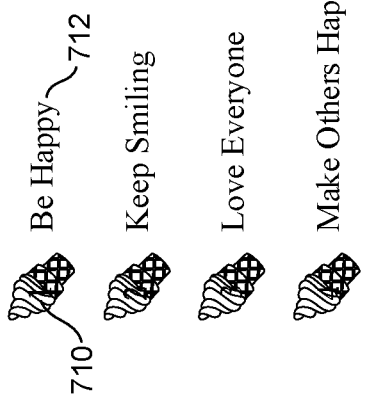
FIGS. 7A-7D provide examples of number-bullet objects provided in association with items in a list, in accordance with embodiments described herein.
Figure 7B:
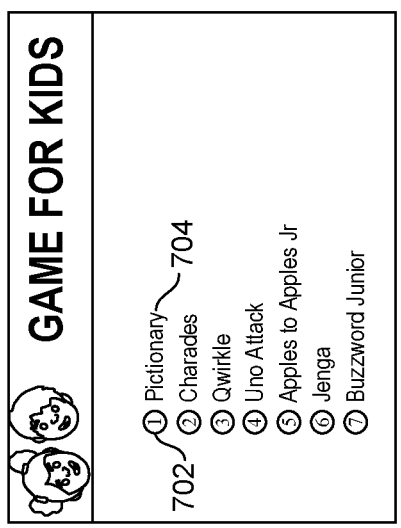
Figure 7C:
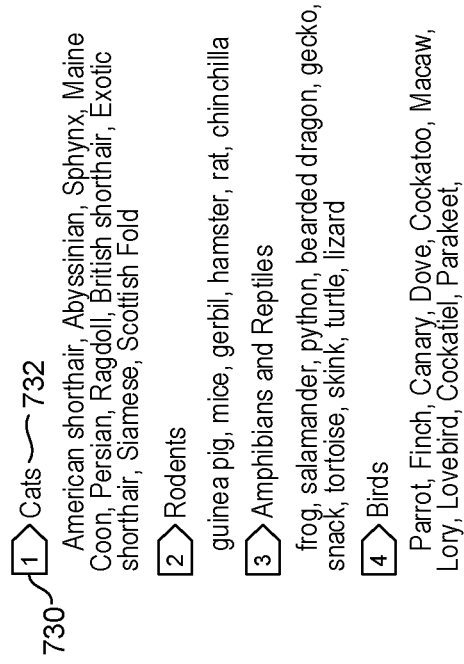
Figure 7D:
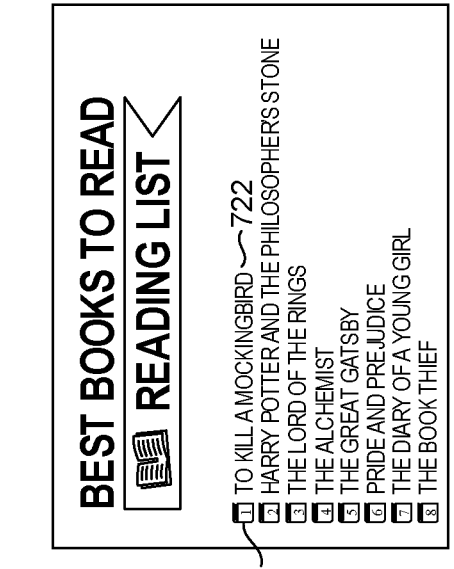

By way of example, and with reference to FIG. 7A-7D, FIGS. 7A-7D provide various examples of number-bullet objects provided in association with items in a list. With reference to FIG. 7A, a first number bullet object 702 with numeral "1" corresponds with a first item 704 in the list. In FIG. 7B, a first number bullet 710 with numeral "1" corresponds with a first item 712 in the list. Similarly, in FIGS. 7C and 7D, a first number bullet 720 and 730, respectively, with numeral "1" correspond with respective first items 722 and 730 in the lists.

The object updater 260 is generally configured update the number-bullet objects, as needed. In particular, as modifications are made to a numbered-bullet object and/or corresponding text item, the numbered-bullet objects can be updated in real time.

By way of example only, assume a user desires to have a font of a different size or style in the number-bullet objects. In such a case, the user may manipulate the number size and/or style of one of the number-bullet objects. In detecting the change, the object updater 260 can automatically update each of the other size and/or styles of numbers in the other number-bullet objects. Such changes may also result in modifications to the bullet, placement of the bullet and/or number, etc., which may be identified in accordance with various embodiments described herein. Similarly, a change to font size and/or style of a text item can result in a change to the style and/or size of the number in the number-bullet object. For instance, in cases in which a user modifies a style and/or size of a text item, the modification can be recognized and used to update the number-bullet objects accordingly (e.g., modify size/style of number, modify size of bullet, modify placement of object and/or number, etc.). As yet another example, the object updater 260 may identify a user change to the image size and initiate reflection of the modification in the other number-bullet objects. Further, if an item and/or numbered-bullet object is removed, the object updater 260 can modify the preceding and/or subsequent numbers to reflect the change. For instance, assume there are five items in a list and a user removes the third item in the list. In such a case, the updater can modify the objects previously reflecting numerals "4" and "5" to change those to "3" and "4" respectively.

Figure 8A:
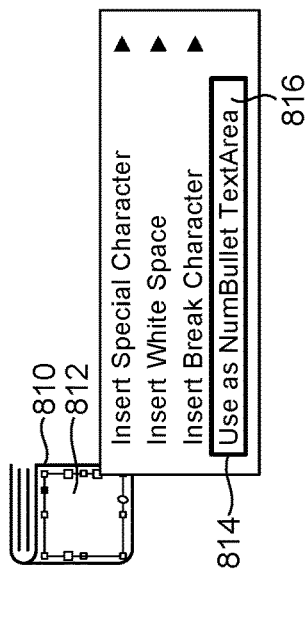
FIGS. 8A-8D provide examples of graphical user interfaces used to facilitate generation of number-bullet objects, in accordance with embodiments described herein.
Figure 8B:
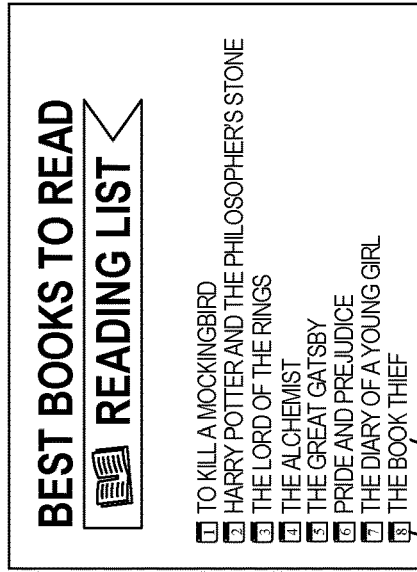

Graphical user interfaces illustrated in FIGS. 8A-8D provide examples of various graphical user interfaces that may be employed to facilitate such a method of generating number-bullet objects. For example, with reference to FIG. 8A, FIG. 8A illustrates a menu 802 that may be used to indicate a desire to create a number-bullet object. For instance, in accordance with a user selecting an image, the user may view a menu (e.g., via a right click) and select to menu option "use as NumBullet" 804 to indicate a desire to use the image for generating number-bullet objects. In accordance with selecting a bullet, the bullet 810 may be presented, as shown in FIG. 8B. The user may then use a selector tool to select an area 812 inside the bullet for use as a candidate text area in which the numbers are desired to be placed. A menu 814 may be used to indicate such an area to be used as a text area by selecting menu option 816 indicating to "Use as NumBullet TextArea."

Figure 8C:
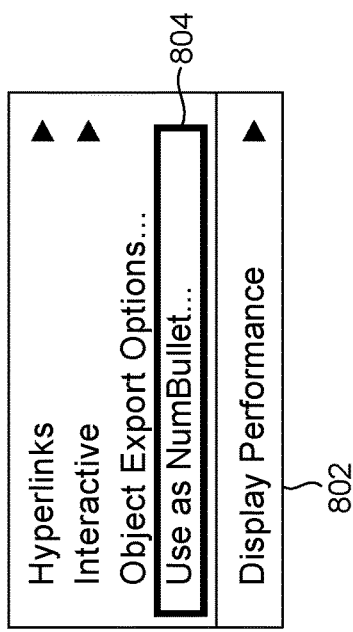
Figure 8D:
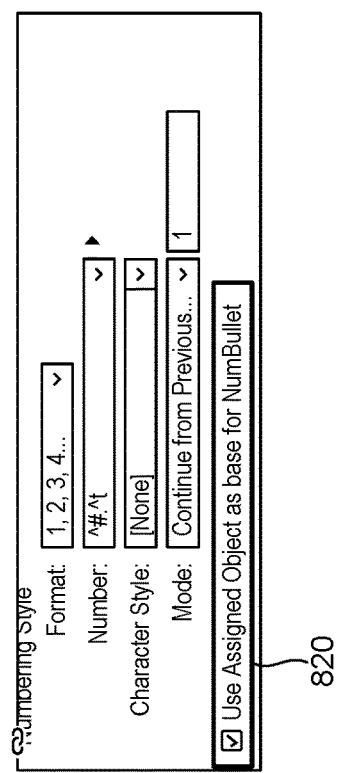

A user may also select items for which corresponding number-bullet objects are to be generated. In accordance with selecting text items and indicating use of numbers, FIG. 8C illustrates an example user interface for indicating, via menu option 820, to use the assigned object as a background or base for a number-bullet object. A user may also select various aspects related to numbering styles. Thereafter, as shown in FIG. 8D, a user may presented with a set of number-bullet objects 830 that correspond with a set of text items 832.

Figure 9:
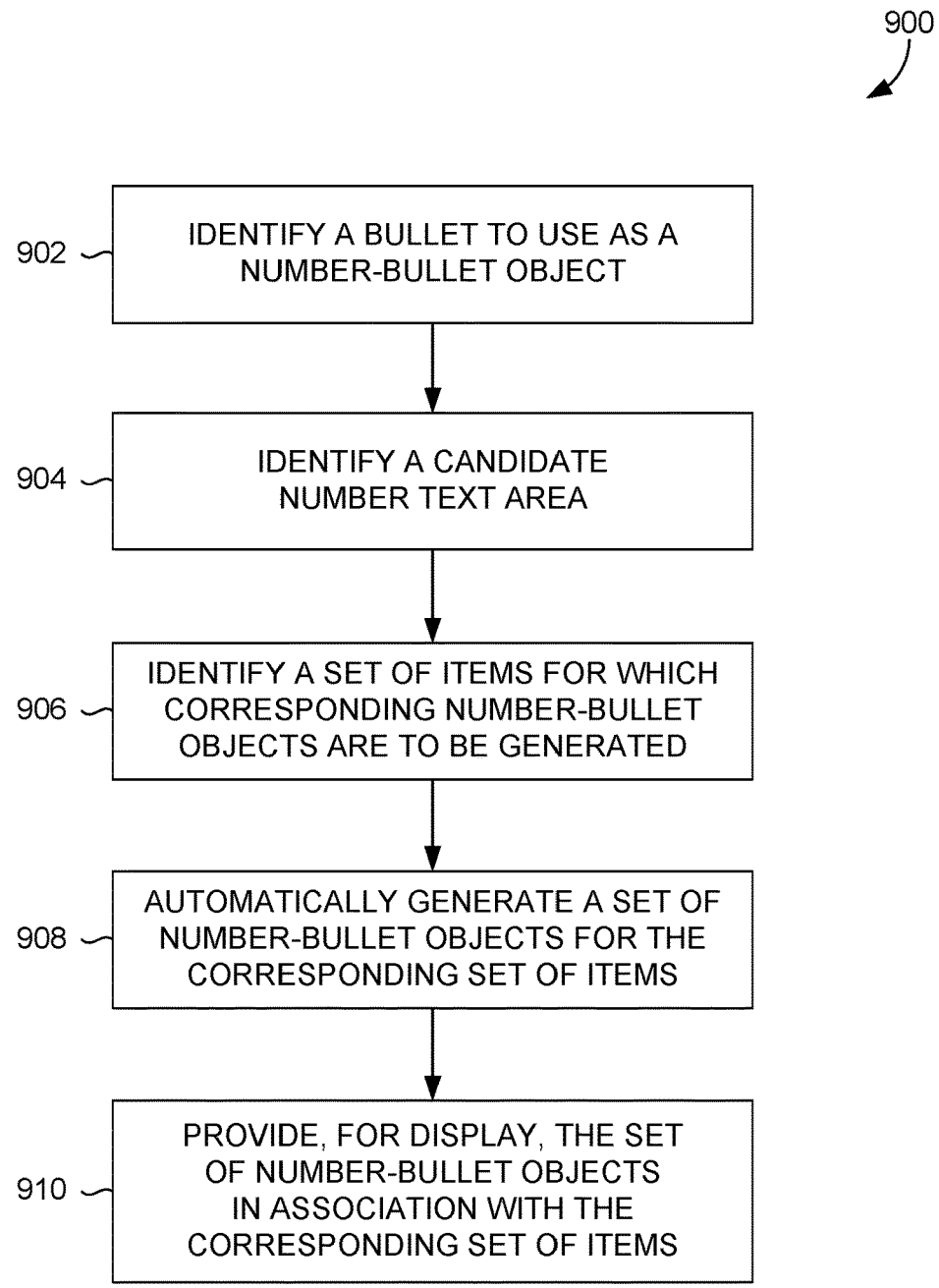
FIG. 9 provides an example method used to generate number-bullet objects, in accordance with embodiments described herein.

Turning now to FIGS. 9-12, FIGS. 9-12 provide example flow diagrams for facilitating generation of number-bullet objects. With specific reference to, FIG. 9 provides one example used to generate number-bullet objects. Initially, at block 902, a bullet to use as a number-bullet object is identified. In one embodiment, a bullet is identified based on a user selection of an image. For example, a user may select an image to be used as a number-bullet object by selecting an image and selecting, via a menu (e.g., drop down), to use the image for generating number-bullet objects.

At block 904, a candidate number text area is identified. As described, a candidate number text area includes an area or region of the bullet in which a number is desired to be placed. A candidate number text area may be selected by a user or automatically determined.

At block 906, a set of items for which corresponding number-bullet objects are to be generated are identified. Such items may be user selected or automatically detected. As one example, a user may select a set of text items in the form of a list and indicate a desire to generate number-bullet objects for such text items.

At block 908, a set of number-bullet objects is automatically generated for the corresponding set of items. Each number-bullet object can include a bullet (e.g. an image) with an appropriate number overlaying the bullet. The number provides a numbered or sorted order of the items in the list. As described herein, the number-bullet objects be similar in size and/or style as the corresponding items. Further, the number-bullet objects can be generated to be visually appealing in terms of placement of the number within the bullet, placement of the number-bullet object relative to the corresponding items, and/or the like.

At block 910, the set of number-bullet objects is provided for display in association with the corresponding set of items. As one example, a first number-bullet object including the number "1" is provided for display adjacent to, and preceding, a first item of the set of items, a second number-bullet object including the number "2") is provided for display adjacent to, and preceding, a second item of the set of items, and so on.

Figure 10:
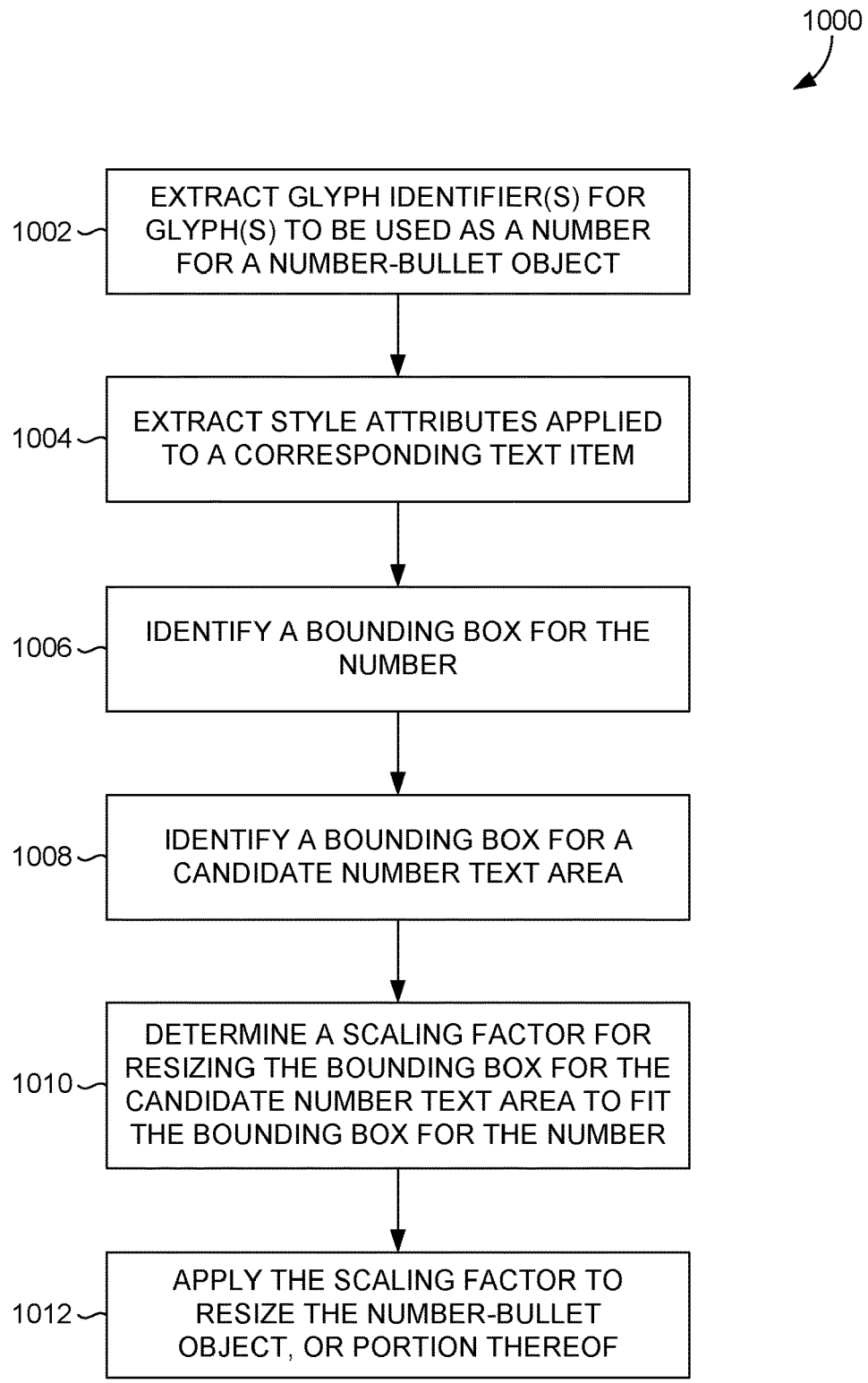
FIG. 10 provides an example method for determining a scaling factor to apply for scaling a number-bullet object, in accordance with embodiments described herein.

As described herein, in some embodiments, the number-bullet objects, or portions thereof, can be scaled to more visually align with the corresponding text items. Turning to FIG. 10, FIG. 10 illustrates a method for determining a scaling factor to apply for such scaling of a number-bullet object. Initially, at block 1002, a glyph identifier(s) for a glyph(s) to be used as a number for number-bullet object is extracted or identified. A glyph identifier uniquely identifies a glyph. At block 1004, a set of style attributes applied to a corresponding text item is extracted or identified. A style attribute may be any type of information related to style of the text item. Style attributes may include, for example, font size, horizontal scale, vertical scale, tracking, and/or the like.

At block 1006, a bounding box is identified for the number to be included in the number-bullet object. For example, in cases that a single glyph constitutes the number, for a given font size, vertical scale, horizontal scale, and tracking, a bounding box of the single glyph can be determined. In cases that multiple glyphs constitutes the number, an individual bounding box can be determined for each glyph. The bounding boxes of the individual glyphs can be concatenated to form a final single bounding box for the combined glyphs representing the number.

At block 1008, a bounding box for a candidate number text area is identified. As described herein, the candidate number text area may be selected by a user or automatically determined, for instance, based on visual balance. At block 1010, a scaling factor is determined for resizing the bounding box for the candidate number text area to fit the bounding box for the number. In embodiments, the scaling factor maintains the aspect ratio of the candidate number text area bounding box. As one example, a width scale can be determined by dividing the bounding box width of the number by the bounding box width of the candidate number text area, and a height scale can be determined by dividing the bounding box height of the number by the bounding box height of the candidate number text area. The scaling factor can then be determined via the width scale and height scale. For instance, a maximum or largest of the width scale and height scale can be selected as the scaling factor. At block 1012, the scaling factor is applied to resize the number-bullet object, or a portion thereof (e.g., the image, the candidate number text area, etc.).

Figure 11:
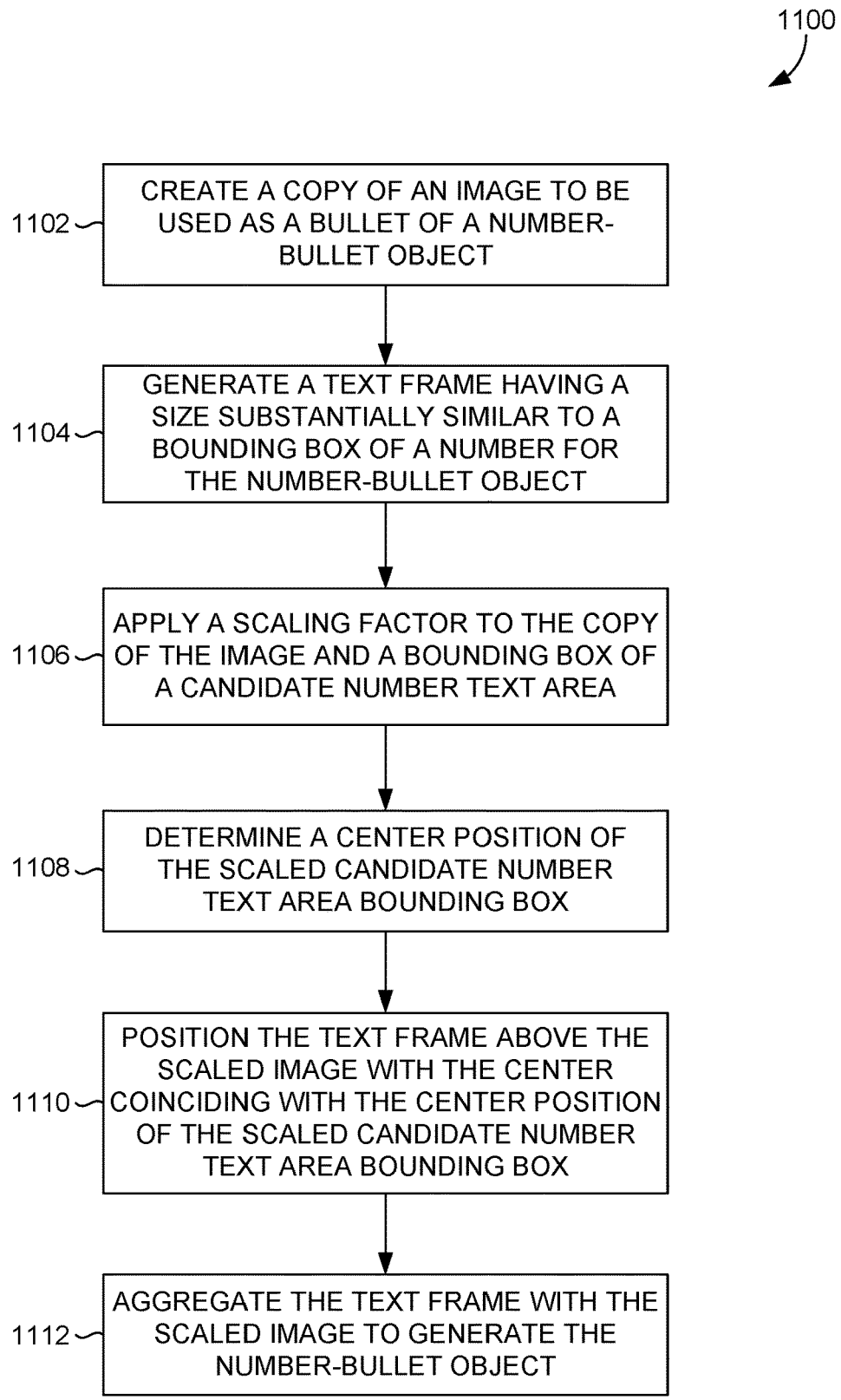
FIG. 11 provides an example implementation for generating a number bullet object for a particular number, in accordance with embodiments described herein.

Turning now to FIG. 11, FIG. 11 provides an example implementation for generating a number-bullet object for a particular number. Initially, at block, 1102, a copy of an image to be used as a bullet of a number-bullet object is created. At block 1104, a text frame having a size substantially similar to a bounding box of a number for the number-bullet object is generated. At block 1106, a scaling factor is applied to the copy of the image and the bounding box of the candidate number text area. In some cases, to do so, a width and height of the image are both multiplied by the scaling factor to determine the scaled image. Similarly, a width and height of the bounding box of the candidate number text area can be multiplied by the scaling factor to determined the scaled candidate number text area. At block 1108, a center position of the scaled candidate number text area bounding box is determined. The text fame is positioned above the scaled image with the center coinciding with the center position of the scaled candidate number text area bounding box, as indicated at block 1110. At block 112, the text frame is aggregated with the scaled image to generate the number-bullet object.

Figure 12:
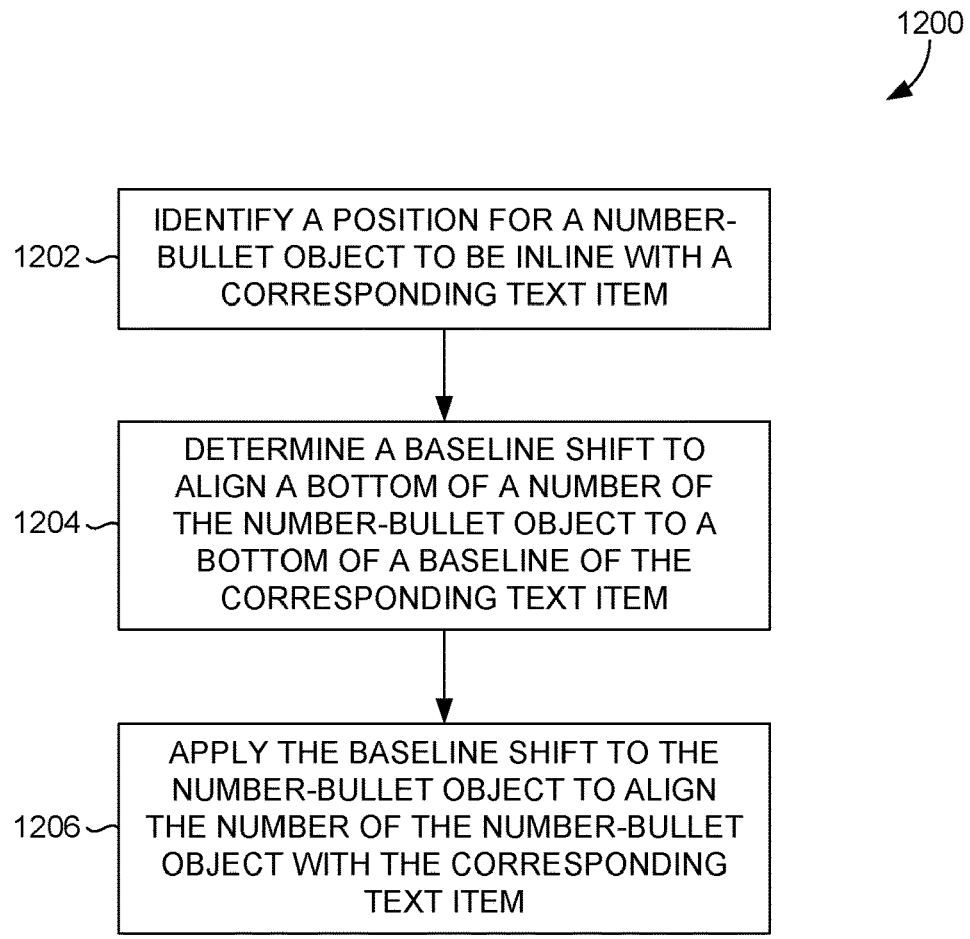
FIG. 12 provides an example method for identifying a baseline shift to place a number-bullet object, in accordance with embodiments described herein.

With reference to FIG. 12, FIG. 12 provides an example method for identifying a baseline shift to place a number-bullet object. At block 1202, a position for a number-bullet object to be inline with a corresponding text item is identified. At block 1204, a baseline shift to align a bottom of a number of the number-bullet object to a bottom of a baseline of the corresponding text item is determined. Thereafter, at bloc, 1206, the baseline shift is applied to the number-bullet object to align the number of the number-bullet object with the corresponding text item.

Figure 13:
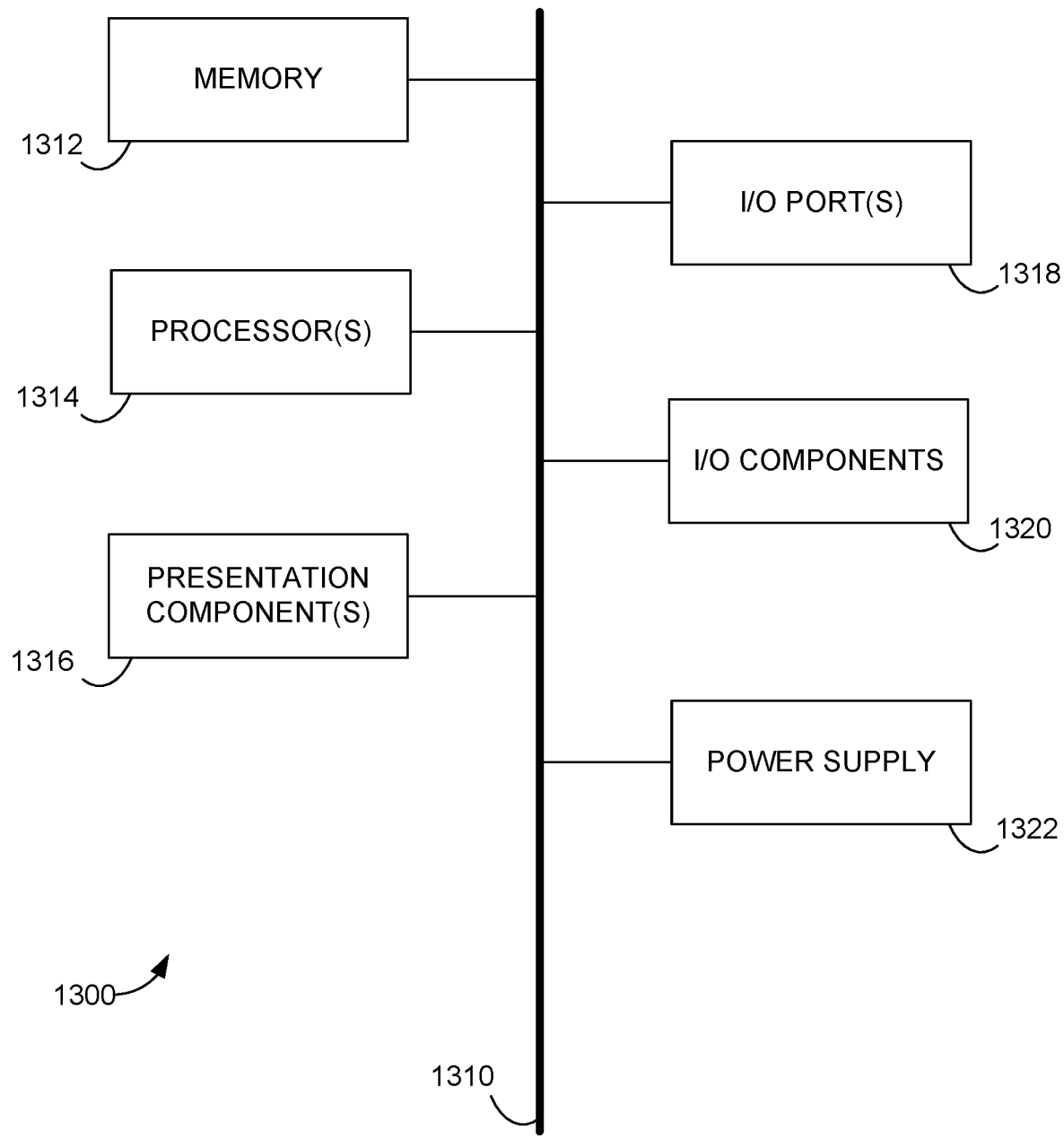
FIG. 13 is a block diagram of an exemplary computing environment suitable for use in implementing embodiments of the present technology.

Having described embodiments of the present technology, an exemplary operating environment in which embodiments of the present technology may be implemented is described below in order to provide a general context for various aspects of the present technology. Referring initially to FIG. 13 in particular, an exemplary operating environment for implementing embodiments of the present technology is shown and designated generally as computing device 1300. Computing device 1300 is but one example of a suitable computing environment and is not intended to suggest any limitation as to the scope of use or functionality of the present technology. Neither should the computing device 1300 be interpreted as having any dependency or requirement relating to any one or combination of components illustrated.

The present technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The present technology may be practiced in a variety of system configurations, including hand-held devices, consumer electronics, general-purpose computers, more specialty computing devices, etc. The present technology may also be practiced in distributed computing environments where tasks are performed by remote-processing devices that are linked through a communications network.

With reference to FIG. 13, computing device 1300 includes a bus 1310 that directly or indirectly couples the following devices: memory 1312, one or more processors 1314, one or more presentation components 1316, input/output (I/O) ports 1318, input/output components 1320, and an illustrative power supply 1322. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 13 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 6 and reference to "computing device."

Computing device 1300 typically includes a variety of computer-readable media. Computer-readable media can be any available media that can be accessed by computing device 1300 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1312 includes computer-storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 1312 or I/O components 1320. Presentation component(s) 1316 present data indications to a user or other device. Exemplary presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, etc. The I/O components 1320 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be equipped with depth cameras, such as stereoscopic camera systems, infrared camera systems, RGB camera systems, touchscreen technology, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

As can be understood, embodiments of the present technology provide for, among other things, generating predictive models. The present technology has been described in relation to particular embodiments, which are intended in all respects to be illustrative rather than restrictive. Alternative embodiments will become apparent to those of ordinary skill in the art to which the present technology pertains without departing from its scope.

From the foregoing, it will be seen that the present technology is well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations to facilitate number-bullet object generation, the method comprising:
   identifying an image to use as a bullet portion in generating a set of number-bullet objects;
   identifying a first text item and a second text item in a list of text items for which to generate corresponding number-bullet objects;
   automatically generating a first number-bullet object for the first text item by overlaying a first number over the image and a second number-bullet object for the second text item by overlaying a second number over the image, the first number and the second number indicating a sequential order of the first text item and the second text item; and
   causing concurrent presentation of the first number-bullet object vertically aligned with the first text item and the second number-bullet object vertically aligned with the second text item.

2. The one or more computer storage media of claim 1, wherein automatically generating the first number-bullet object for the first text item and the second number-bullet object for the second text item further comprises:
   generating a first copy of the image and a second copy of the image; and
   determining a placement for the first number within the first copy of the image and a placement for the second number within the second copy of the image.

3. The one or more computer storage media of claim 1, wherein generating the first number-bullet object for the first text item further comprises:
   identifying a candidate number text area within the image in which to place numbers; and
   positioning the first number-bullet object within the candidate number text area.

4. The one or more computer storage media of claim 3, wherein the candidate number text area is a user selected portion of the image.

5. The one or more computer storage media of claim 3, wherein the candidate number text area is automatically determined by identifying a salient region of the image based on a saliency map indicating color, intensity, and orientation associated with pixels of the image.

6. The one or more computer storage media of claim 1, wherein generating the first number-bullet object for the first text item further comprises:
   scaling the image by a scaling factor;
   scaling a candidate number text area by the scaling factor, the candidate number text area being an area within the image; and
   placing a number text frame over the image at a position that coincides with a center of the scaled candidate number text area.

7. The one or more computer storage media of claim 6, wherein the number text frame has a size equal to a bounding box for the first number.

8. The one or more computer storage media of claim 7, wherein the first number comprises a size and a style visually proportional to a size and a style applied to the first text item.

9. The one or more computer storage media of claim 6, further comprising determining the scaling factor by:
- determining a bounding box for the first number;
- determining a bounding box for the candidate number text area; and
- using the bounding box for the first number and the bounding box for the candidate number text area to determine the scaling factor that results in a resizing of the bounding box for the candidate number text area to fit the bounding box for the first number.

10. The one or more computer storage media of claim 1, further comprising determining a baseline shift for vertically shifting the first number-bullet object from an inline position relative to the first text item such that the first number vertically aligns with a baseline of the first text item.

11. A method to facilitate number-bullet object generation, the method comprising:
- identifying an image to use as a bullet portion in generating a set of number-bullet objects;
- identifying a set of text items for which to generate corresponding number-bullet objects;
- determining a candidate number text area within the image in which to place a number in each number-bullet object;
- automatically generating a set of number-bullet objects for the corresponding set of text items by, for each number-bullet object, generating a copy of the image and overlaying a number over the copy of the image within the candidate number text area, wherein the number for each number-bullet object corresponds with a sequential order of the set of text items; and
- causing presentation of the set of number-bullet objects vertically aligned with the corresponding set of text items.

12. The method of claim 11, wherein a bottom edge of the number within each number-bullet object is vertically aligned with a baseline of the corresponding text item.

13. The method of claim 11, wherein generating each number-bullet object further comprises:
- scaling the image by a scaling factor;
- scaling the candidate number text area by the scaling factor; and
- placing a number text frame over the copy of the image at a position that coincides with a center of the scaled candidate number text area.

14. The method of claim 13, wherein the number text frame has a size that accommodates the number-bullet object.

15. The method of claim 13 further comprising determining the scaling factor by:
- determining a bounding box for the number of the corresponding number-bullet object;
- determining a bounding box for the candidate number text area; and
- using the bounding box for the number and the bounding box for the candidate number text area to determine the scaling factor that results in a resizing of the bounding box for the candidate number text area to fit the bounding box for the number.

16. The method of claim 11, wherein the number comprises a size and a style visually proportional to a size and a style applied to the corresponding text item.

17. One or more computer storage media storing computer-useable instructions that, when used by one or more computing devices, cause the one or more computing devices to perform operations to facilitate number-bullet object generation, the method comprising:
- receiving an indication of an image to be used as a number-bullet object;
- identifying a candidate number text area within the image desired for positioning a number text frame in which to place numbers;
- receiving an indication of a list of text items for which number-bullet objects are desired; and
- based on the indication of the list of text items for which number-bullet objects are desired, causing presentation of a plurality of number-bullet objects automatically placed in vertical alignment with the corresponding text items, wherein each number-bullet object includes a sequential number placed in the number text frame within the candidate number text area of the image and is automatically generated to be proportional in size as the corresponding text item based on application of a scaling factor determined using a bounding box of the candidate number text area and a bounding box of the corresponding sequential number.

18. The one or more computer-readable media of claim 17, wherein automatically generating the number-bullet objects to be proportional in size as the corresponding text item further comprises, for each number-bullet object:
- identifying the bounding box for the sequential number having a font size proportional to a font size of the corresponding text item;
- identifying the bounding box of the candidate number text area;
- determining the scaling factor required to resize the candidate number text area to fit the bounding box for the sequential number while maintaining an aspect ratio of the bounding box of the candidate number text area; and
- applying the scaling factor to the image and the candidate number text area to scale the image and the candidate number text area.

19. The one or more computer-readable media of claim 17, further comprising placing the number text frame within the scaled candidate number text area.

20. The one or more computer-readable media of claim 17 further comprising determining the candidate number text area by identifying a salient region of the image based on a saliency map indicating color, intensity, and orientation associated with pixels of the image.

* * * * *